United States Patent
Aytur

(10) Patent No.: US 8,204,466 B2
(45) Date of Patent: Jun. 19, 2012

(54) DYNAMIC AC-COUPLED DC OFFSET CORRECTION

(75) Inventor: Turgut Aytur, Plattsburgh, NY (US)

(73) Assignee: Realtek Semiconductor Corp., Hsinchu (TW)

( * ) Notice: Subject to any disclaimer, the term of this patent is extended or adjusted under 35 U.S.C. 154(b) by 1617 days.

(21) Appl. No.: 10/850,774

(22) Filed: May 21, 2004

(65) Prior Publication Data

US 2005/0260967 A1     Nov. 24, 2005

(51) Int. Cl.
*H04B 1/10* (2006.01)
(52) U.S. Cl. ........ 455/307; 455/133; 455/137; 455/213; 455/150.1; 455/63.3
(58) Field of Classification Search ............... 455/310, 455/296, 24.1, 232.1, 136, 138, 164.1, 171.1, 455/181.1, 197.2, 213, 240.1, 278.1, 299, 455/306, 338–340, 307, 234.1, 150.1, 226.1, 455/227, 63.1, 63.3, 67.11, 67.13, 130
See application file for complete search history.

(56) References Cited

U.S. PATENT DOCUMENTS

| | | | |
|---|---|---|---|
| 5,617,060 A | 4/1997 | Wilson et al. | |
| 5,734,975 A * | 3/1998 | Zele et al. | 455/307 |
| 5,748,681 A | 5/1998 | Comino et al. | |
| 5,841,876 A * | 11/1998 | Gifford et al. | 381/71.14 |
| 6,013,958 A | 1/2000 | Aytur | |
| 6,118,332 A * | 9/2000 | Jabs | 327/553 |
| 6,278,391 B1 * | 8/2001 | Walker | 341/118 |
| 6,324,231 B1 | 11/2001 | Huang | |
| 6,442,380 B1 * | 8/2002 | Mohindra | 455/234.1 |
| 6,549,054 B2 | 4/2003 | Ono | |
| 6,915,141 B2 * | 7/2005 | Loke | 455/550.1 |
| 7,003,271 B2 * | 2/2006 | Kluge et al. | 455/240.1 |
| 7,027,790 B2 * | 4/2006 | Westra et al. | 455/250.1 |
| 7,065,336 B2 * | 6/2006 | Spiegel | 455/244.1 |
| 7,110,734 B2 * | 9/2006 | Mohindra | 455/234.1 |
| 7,184,736 B2 * | 2/2007 | Zhou | 455/296 |
| 2003/0072320 A1 * | 4/2003 | Seo et al. | 370/441 |
| 2003/0125000 A1 * | 7/2003 | Gharpurey et al. | 455/234.1 |
| 2003/0133518 A1 | 7/2003 | Koomullil et al. | |
| 2003/0174079 A1 | 9/2003 | Soltanian et al. | |
| 2003/0203727 A1 | 10/2003 | Kluge et al. | |
| 2004/0097212 A1 | 5/2004 | Matsumoto et al. | |
| 2004/0263211 A1 * | 12/2004 | Kang | 327/2 |
| 2004/0264601 A1 * | 12/2004 | Demir et al. | 375/322 |
| 2005/0070240 A1 | 3/2005 | Adler et al. | |
| 2005/0117502 A1 * | 6/2005 | Kanda | 369/124.11 |
| 2006/0066395 A1 * | 3/2006 | Elmala et al. | 330/9 |
| 2006/0068746 A1 * | 3/2006 | Feng et al. | 455/323 |
| 2006/0240779 A1 * | 10/2006 | Rostami et al. | 455/63.1 |

OTHER PUBLICATIONS

International Search Report dated Nov. 11, 2005 for International Application No. PCT/US2005/017970, filed May 19, 2005, International Search Report mailed Dec. 14, 2005 (2 pgs.).
Written Opinion dated Nov. 11, 2005 for International Application No. PCT/US2005/017970, filed May 19, 2005, Written Opinion mailed Dec. 14, 2005 (3 pgs.).

* cited by examiner

*Primary Examiner* — Pablo Tran
(74) *Attorney, Agent, or Firm* — Thomas, Kayden, Horstemeyer & Risley, LLP

(57) ABSTRACT

Methods and systems that utilize AC-coupled filtering to reduce DC offset, with aspects dynamically correcting instantaneous DC offset generated from the AC-coupled filtering. A DC offset correction circuit for an radio frequency (rf) receiver comprises a switchable high pass filter receiving a downconverted rf signal. The switchable high pass filter has N selectable corner frequencies, where N is greater than two.

10 Claims, 7 Drawing Sheets

DYNAMIC AC-COUPLED DC OFFSET CORRECTION

BACKGROUND OF THE INVENTION

The present invention relates generally to wireless communication systems and methods, and more specifically to DC offset cancellation for a wireless receiver.

Wireless network technology conveniently allows a mobile user to wirelessly connect to a wired network, such as an enterprise's local area network (LAN). Heterodyne receivers and direct downconversion receivers are generally used to receive wireless transmissions. In a heterodyne receiver, a radio frequency (RF) signal is mixed with a signal from a local oscillator to produce an intermediate frequency (IF) signal. Through various IF stages with mixers, oscillators, and filters, the IF signal eventually is downconverted to a baseband signal for further processing.

Direct downconversion receivers (DCRs) directly downconvert a received RF signal to a baseband signal without additional signal processing at various IF stages. DCRs have a local oscillator operating at the carrier frequency used to downconvert signals to baseband, resulting in a simpler architecture. The downconverted signal is amplified by a gain to achieve optimal signal strength before presentation to a digital detector or demodulator for further processing.

Processing of received signals may be negatively impacted by DC offset. DC offset may occur due to, for example, current leakage from a receiver's local oscillator (LO), signal reflections, temperature changes, and other causes.

An AC-coupled high pass filter can provide a straightforward approach to correct DC offset, with the filter removing low frequency and DC signal components. Such high pass filters are more effective in removing effective DC offset when the corner frequency of the filter is closer to the frequencies carrying information. Unfortunately, filters with high corner frequencies are also more likely to attenuate signals at the information carrying frequencies. Accordingly, some have proposed use of a high pass filter with a corner frequency switchable from a first higher frequency used during initial reception to a second lower frequency during reception of other portions of a signal. Use of such filters, however, may result in a substantially instantaneous change, or distortion, in perceived signal strength and DC offset by downstream processing components.

BRIEF SUMMARY OF THE INVENTION

The invention provides methods and systems that utilize AC-coupled filtering to reduce DC offset, with aspects dynamically correcting instantaneous DC offset generated from the AC-coupled filtering. In one aspect, the invention provides a DC offset correction circuit for an radio frequency (rf) receiver, comprising a switchable high pass filter receiving a downconverted rf signal, the switchable high pass filter having N selectable corner frequencies, where N is greater than two.

In another aspect of the invention, the invention comprises a method, using an AC-coupled filter, of reducing DC offset in a downconverted signal in a wireless receiver receiving a signal including a preamble, the method comprising changing the corner frequency of the AC-coupled filter a plurality of times during reception of the preamble.

In another aspect of the invention, the invention comprises a receiver including a DC offset correction system in a receiver, comprising a mixer downconverting a received signal to form a downconverted signal; a first AC-coupled high pass filter having an input in at least one-way data communication with the mixer, the first AC-coupled high pass filter having a switchable corner frequency dependent on a frame state of a received signal; and a plurality of second AC-coupled high pass filters coupled to an output of the first AC-coupled high pass filter, each of the plurality of second AC-coupled high pass filters having a switchable corner frequency dependent on the frame state of the received signal.

In another aspect of the invention, the invention comprises a method for correcting DC offset in a wireless receiver, the method comprising high pass filtering a downconverted signal to substantially reduce signal components below a first frequency during a first time period; high pass filtering the downconverted signal to substantially reduce signal components below a second frequency during a second time period; and high pass filtering the downconverted signal to substantially reduce signal components below a third frequency during a third time period.

These and other aspects of the invention are more fully appreciated in view of this disclosure including the associated figures.

BRIEF DESCRIPTION OF THE DRAWINGS

In the drawings, like reference characters generally refer to the same parts throughout the different drawings.

DETAILED DESCRIPTION

Figure 1:
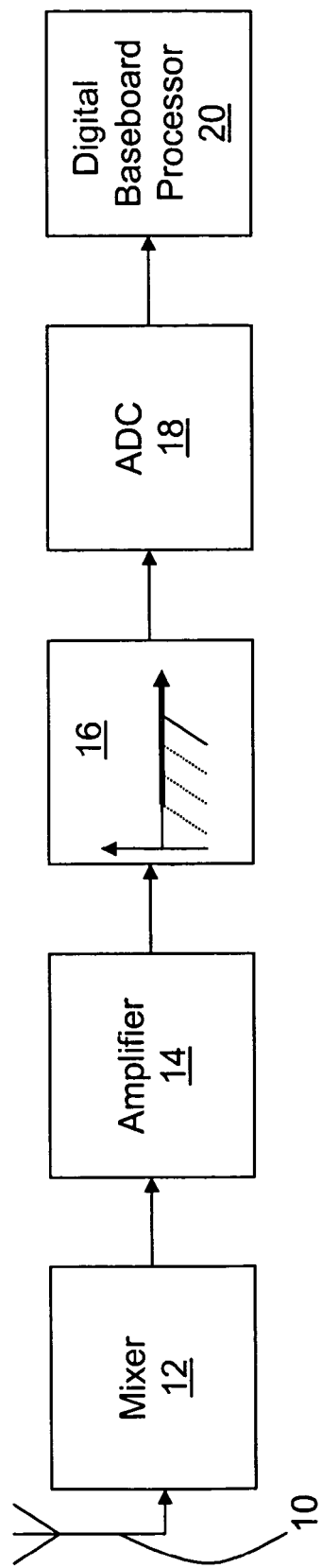
FIG. 1 is a block diagram of an embodiment of a receiver in a communication system in accordance with aspects of the invention.

FIG. 1 illustrates a direct conversion receiver (DCR) 10 in a communication system in accordance with aspects of the invention. In typical implementations, the communication system of FIG. 1 operates in a radio frequency based network. In one embodiment, a source (not shown) provides a data stream in a digital format. The source in some embodiments is a computer system, a personal digital device that has wireless communication capability, or other digital device of subsystem of such a device. The source provides information in a digital form to, for example, a QAM (quadrature amplitude modulation) modulator (not shown). The QAM modulator receives the information in digital form and modulates the digital signal to form an analog signal stream. The QAM modulator then provides the analog signal stream to a transmitter (not shown), which transmits the analog signal stream to the receiver.

In the receiver, an RF antenna 10 receives an analog signal stream. The received signal stream is provided to a mixer 12. The mixer 12 mixes a local oscillator (LO) signal with the received signal. The LO signal is provided by a local oscillator (not shown). The LO signal is at the received RF signal's center frequency, so the mixer 12 downconverts the RF signal into a baseband signal. Very often, the received signal is in quadrature, and two mixers are used to generate I-channel and Q-channel signals. In other embodiments the mixer downconverts the signal to an IF signal.

An amplifier 14 receives the downconverted signal and provides an amplified downconverted signal. In some embodiments, the amplifier 14 is a variable gain amplifier, with the magnitude of the gain determined, for example, by an automatic gain control circuit.

The amplified downconverted signal is passed through a N-corner switchable high pass filter 16. The N-corner switchable high pass filter includes N, with N more than two, corner frequencies. In some embodiments, in operation the corner frequency is successively lowered during reception of a preamble field of a data stream. After filtering by the N-corner switchable high pass filter the filtered amplified downconverted signal is provided to an analog to digital converter (ADC) 18. In some embodiments, such as where the signal received by the filter is an IF signal, further downconversion may first be performed.

The ADC converts the analog baseband signal to a digital signal, and forwards the digital signal to a digital baseband processor 20. The digital baseband processor performs additional processing, such as demapping, framing, and other processing.

Figure 2:
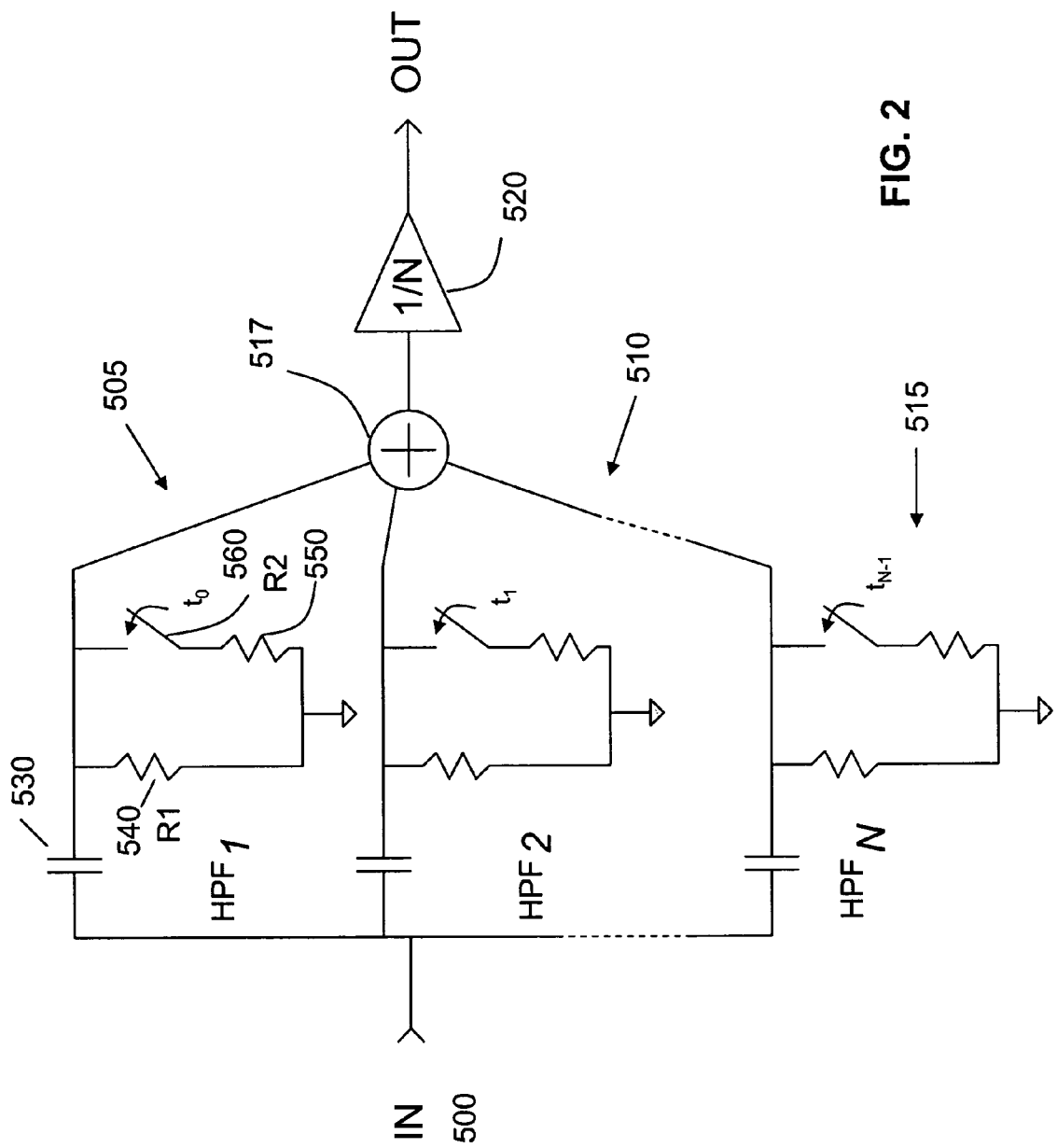
FIG. 2 schematically depicts an embodiment of an N-corner switchable high pass filter used in a receiver in accordance with aspects of the present invention.

FIG. 2 schematically depicts an embodiment of an N-corner switchable high pass filter in accordance with aspects of the invention. The filter is used as part of a receiver system such as the system of FIG. 1. The filter of FIG. 2 includes N switchable high pass filters 505, 510, 515. In one embodiment, the high pass filters have identical, virtually identical, or substantially similar components, where each of the filters has controllable corner frequencies. In some embodiments, the corner frequencies are controlled by control signals triggered at different times. The N high pass filters, $HPF_1$, $HPF_2$, ..., $HPF_N$, are interconnected in parallel, sharing a common input 500. The outputs of the filters, $HPF_1$, $HPF_2$, ..., $HPF_N$, are summed together in a summer 517 and are linearly scaled by the sampling factor N by a divider (or attenuator) 520.

Each high pass filter includes a capacitor and a first resistor R1 connected in series, with the resistor R1 coupled to ground and the output of the filter taken between the capacitor and the resistor. A second resistor R2 is coupled in parallel to the resistor R1 by a switch.

Each high pass filter is therefore a high pass RC filter, with a corner frequency inversely dependent on the capacitance C and the resistance R. When the switch is closed the resistance is $$\frac{R_1 R_2}{R_1 + R_2}.$$

When the switch is open the resistance is R1, which will generally be greater than $$\frac{R_1 R_2}{R_1 + R_2}.$$

As the corner frequency inversely depends on the resistance, the higher effective resistance when the switch is open reduces the corner frequency of the filter.

Taking the high pass filter $HPF_1$ as an example, $HPF_1$ includes a capacitor 530 and a resistor R1 540 connected in series. A further resistor R2 550 is coupled in parallel to the resistor 540 by a switch 560. The high pass filter $HPF_1$ has a higher corner frequency when the switch 560 is closed. The high pass filter $HPF_1$ has a lower corner frequency when the switch 560 is open. The other high pass filters $HPF_2$, ..., $HPF_N$, are configured and operate in the same manner.

In operation, the switches of the $HPF_1$, $HPF_2$, ..., $HPF_N$ are initially closed and then sequentially opened over a course of one period T of a received signal. For example, for $HPF_1$, the switch is open at $t_0$, the switch for $HPF_2$ is open at $t_1$, and the switch for $HPF_N$ is open at $t_{N-1}$, where $t_0 < t_1 < \ldots < t_{N-1}$. More particularly, in some embodiments switches are open at N equally spaced sampling points, such that $t_1 - t_0 = t_2 - t_1$, etc.

In an exemplary embodiment the filter of, for example, FIG. 2 is used in an 802.11 wireless receiver. Corner frequencies for the filter are switched at N equally spread sample points within a period of a preamble of a received signal. Thus, for the filter of FIG. 2, the N switches are open at N equally spaced sample points within one period of the preamble.

Figure 3:
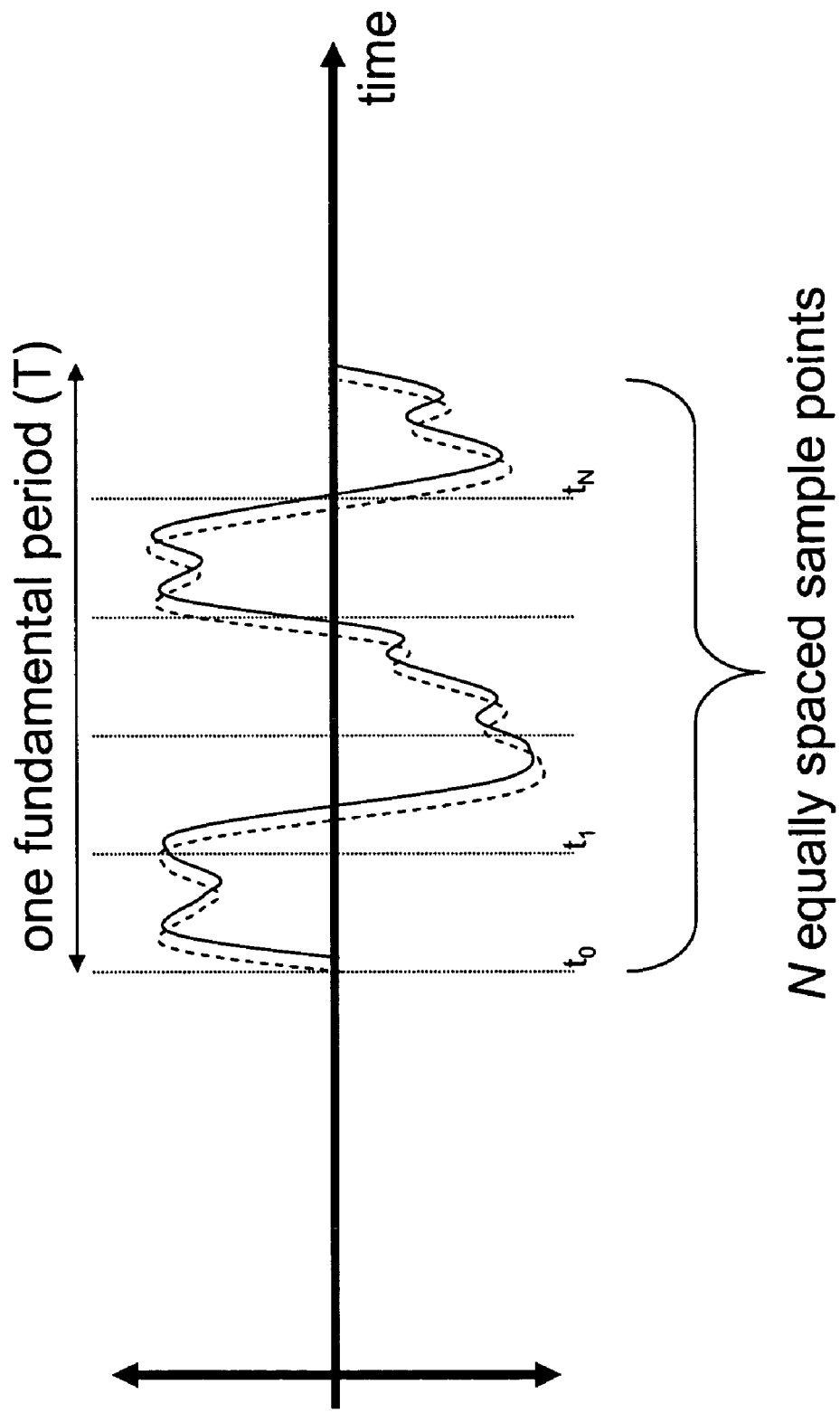
FIG. 3 illustrates sampling of a preamble field in an RF signal with N equally spaced sample points.

FIG. 3 illustrates an example of a preamble field of an RF signal at the receiver 10 in a time domain and a frequency domain. In an exemplary IEEE 802.11 compliant frame structure, an RF signal comprises a number of frames, where each of the frames has a preamble field and a data field. For an IEEE 802.11g-based communication system, the preamble signal components are periodic at every T=800 ns.

It is believed that a method of operation of sequentially opening the switches of the filter at N equally spaced sampling points within a preamble field reduces instantaneous DC offset caused by switching corner frequencies. For an 802.11g signal, the preamble sequence of the signal may be represented as $$x(t) = \sum_{m=1}^{M} A_m \sin(m\omega t + \phi_m).$$

When sampled by N equally spaced sampled points, $\omega = 2\pi/T$ and $t = nT/N$. Substituting these values for $\omega$ and $t$ provides $$x = \sum_{m=1}^{M} \sum_{n=1}^{N} A_m \sin(2\pi mn/N + \phi_m).$$

Considering, $\sin(a+b) = \sin a \cos b + \sin b \cos a$, and $\sin(n\pi) = 0$, $\cos(n\pi) = -1$; for $n$=odd; and $\cos(n\pi) = 1$; for $n$=even, and the periodicity of the sin and cosine functions, for all odd M, $$\sum_{n=1}^{2} \sin(2\pi mn/N + \phi) = 0$$

Similarly, for even m and N constrained to 2km, k any integer, $$\sum_{n=1}^{2kM} \sin(2\pi mn/2kM + \phi) = 0.$$

For 802.11g implementations, M=2, 4, 6. The smallest common denominator for 2M=4, 8, 12, is 24. Thus, for 24 sampling points the RMS error reduction due to switching corner frequencies is 100%. Similarly, for 2 sampling points the RMS error reduction is 50%, for 4 sampling points the RMS error reduction is 66%, and for 8 samplings the RMS error reduction is 83%. Although N=24 provides an optimal error reduction rate of 100%, it is believed that N=4, with an error reduction of 66%, provides an acceptable rate of error reduction.

Accordingly, in various embodiments a high pass filtering system is used in a receiver. The filtering system has a plurality of corner frequencies, with the number of corner frequencies a multiple of the number of fundamental frequencies of a sampled signal. Each corner frequency is assigned a sampling point within a period of at least one of the frequencies.

Figure 4:
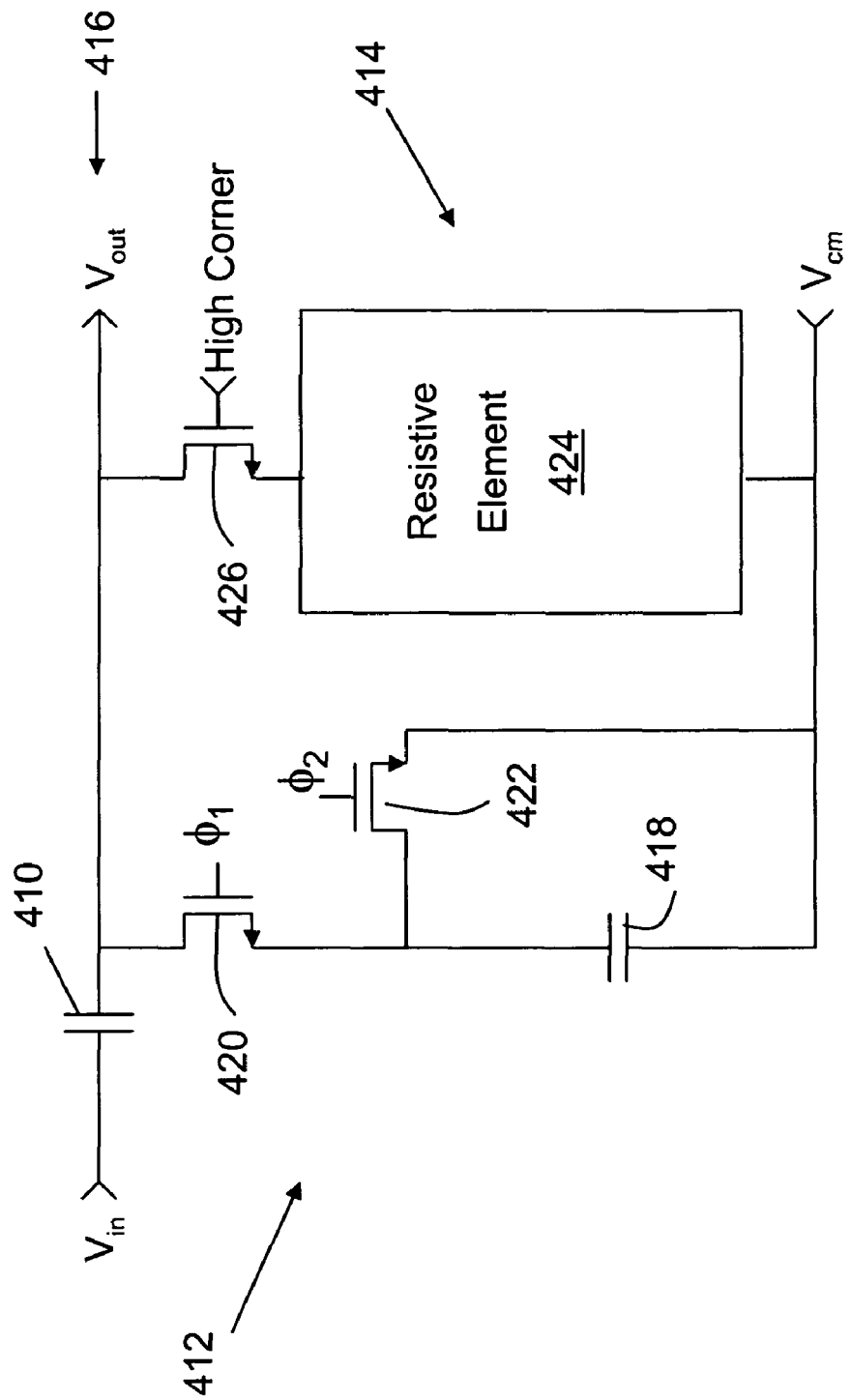
FIG. 4 schematically depicts an implementation of an embodiment of a high pass filter useful in an N-corner switchable high pass filter in accordance with aspects of the present invention.

FIG. 4 schematically depicts a further embodiment of a switchable high pass filter in accordance with aspects of an AC-coupled DC offset correction circuit in accordance with the invention. The filter of FIG. 4 uses a switched capacitance resistor. A switched capacitance resistor uses two switches to charge and discharge, respectively, a capacitor. Non-overlapping clocks of the same frequency, but differing in phase, are used to open and close each switch. The equivalent resistance of the switched capacitance resistor is inversely proportional to the frequency of the non-overlapping clocks and the capacitance. Use of a switched capacitance resistor obviates the need to use a resistor, which may use excess space and be subject to process variations in an integrated circuit. Further, as process variations are expected to affect capacitors in similar ways, the corner frequency of an RC filter using a switched capacitance resistor is largely immune to process variations.

The filter of FIG. 4 includes a capacitor 410 and a first resistance 412 in series, with the output of the filter taken between the capacitor and the first resistance. A second resistance 414 is coupled in parallel to the first resistance by a switch 426. The first resistance is provided by a switched capacitor. The switched capacitor is formed by coupling a capacitor 418 with a first switch 420 coupling a node of the capacitor 418 to the output of the capacitor 410 and a second switch 422 coupling the same node to common. In some embodiments, the capacitor 418 is a cascade of capacitors connected in series. The first and second switches are each set to an on or off state by applying clock signals $\phi_1$ and $\phi_2$, to the switches 420 and 422 respectively. The clock signals are non-overlapping clock signals with the same frequency.

As illustrated in FIG. 4, the switches are transistors, and more specifically the switches 420 and 422 are NMOS transistors, receiving the clock signals $\phi_1$ and $\phi_2$. In some embodiments, the switches may be, but are not limited to, PMOS transistors, bipolar junction transistors (BJTs), MESFETs, or other types of a transistors.

The second resistance is provided by a resistive element 424. In one embodiment, the resistive element 424 is a resistor. In some embodiments, the resistive element 424 is a transistor or a series of transistors set to operate in their linear range. A switch 426 allows current to flow through the resistive element 424. In one embodiment, the switch 426 is an NMOS transistor, as illustrated in FIG. 4. In some embodiments, the switch may be, but is not limited to, a PMOS transistor, a bipolar junction transistor (BJT), a MESFET, or other types of a transistor. The switch 426 changes its state by application of a corner switching signal to its gate. The filter has a higher corner frequency when the corner switching signal closes the switch and couples the second resistance to the output node.

Figure 5:
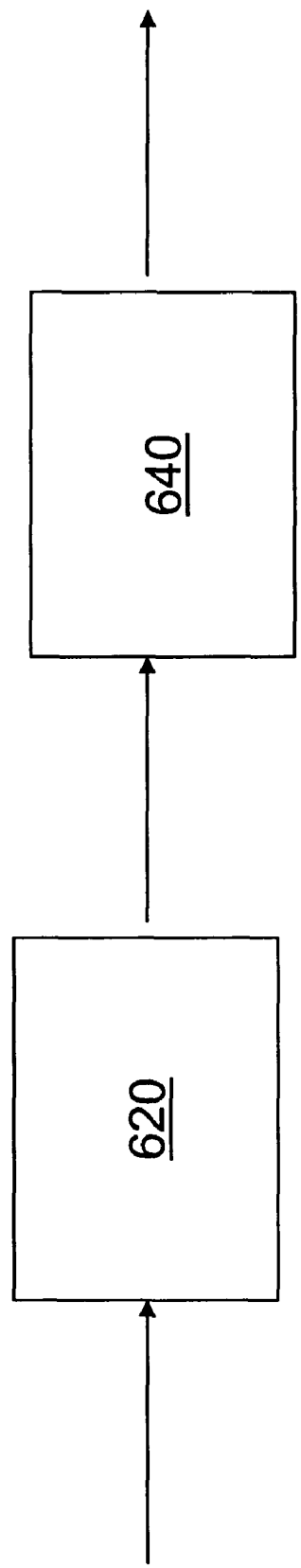
FIG. 5 is a block diagram of an embodiment of an N-corner switchable high pass filter useful in a receiver in accordance with aspects of the present invention.

FIG. 5 is a block diagram depicting an embodiment of an N-corner switchable high pass filter in accordance with aspects of the present invention. In one embodiment, the switchable high pass filter has N selectable corner frequencies, where N is greater than two. In some embodiments, the switchable high pass filter comprises N number of high pass filters, where N is greater than two. In these embodiments, the high pass filters are switchable from a first corner frequency to a second corner frequency. In one embodiment, the high pass filters have identical, virtually identical, or substantially similar components, where each of the filters has controllable corner frequencies. In some embodiments, the corner frequencies are controlled by control signals triggered at different times. As illustrated in FIG. 5, N number of switchable high pass filters are distributed over two blocks 620 and 640. In some other embodiments, N number of switchable high pass filters are distributed over K number of blocks, where K can be any integer between 1 and N. Referring back to the blocks 620 and 640 of FIG. 5, within each block, the high pass filters may be arranged in parallel, in series, or in a combination of a parallel and serial arrangements. In some embodiments, within each block, at least some of the high pass filters are arranged in series and at least some of high pass filters are arranged in parallel.

Figure 6:
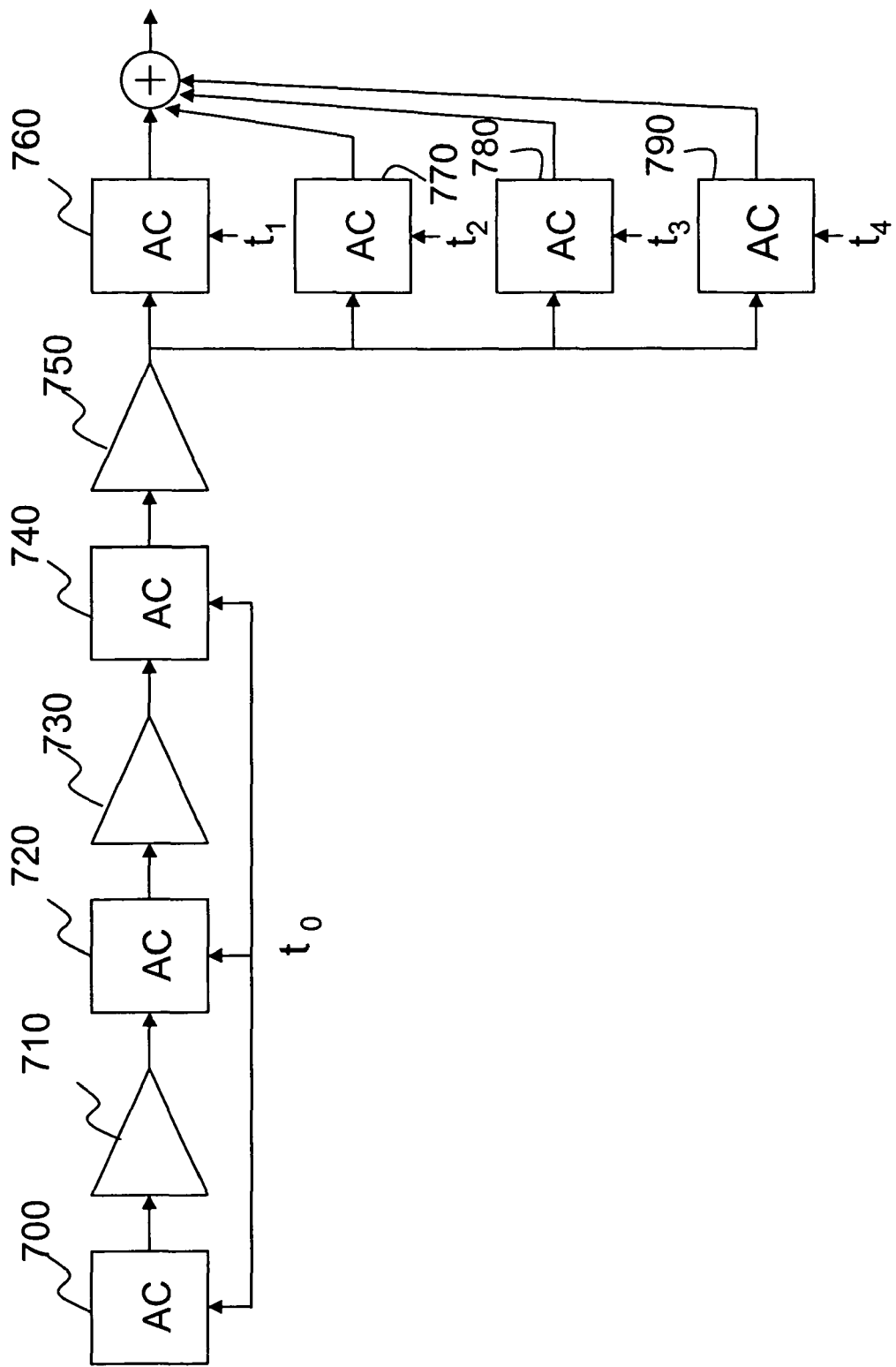
FIG. 6 is a block diagram of a further N-corner switchable high pass filter useful in a receiver in accordance with aspects of the present invention.

FIG. 6 is a block diagram depicting a further embodiment of a switchable high pass filter used as dynamic AC-coupled DC offset correction circuit in accordance with aspects of the present invention. The filter includes a first switchable high pass filter formed by a series of switchable high pass filters, 700, 720, 740 interspersed by amplifiers, or buffers, 710, 730, 750.

The output of the last buffer in the series is provided to four parallel switchable high pass filters 760, 770, 780, 790. The output of each of the parallel switchable high pass filters is provided to a summer 795. The switchable high pass filters may be, for example, the filters illustrated in FIG. 2 or 4.

The corner frequency is lowered for the series of filters at a first time, $t_o$, as illustrated in FIG. 5. Changing the corner frequency of the series of filters effectively results in a somewhat instaneous change in the signal output from the series of filters. This change may be viewed as a change in the DC offset of the received signal, particularly by other circuitry such as AGCs. Effects of the change are reduced, however, by subsequent passage of the signal through the parallel filters.

The corner frequency of the filters in parallel is lowered sequentially for the filters 76, 770, 780, and 790 at times $t_1$, $t_2$, $t_3$, and $t_4$, respectively. Preferably times $t_1$, $t_2$, $t_3$ and $t_4$ are within one fundamental period of a received signal.

Figure 7:
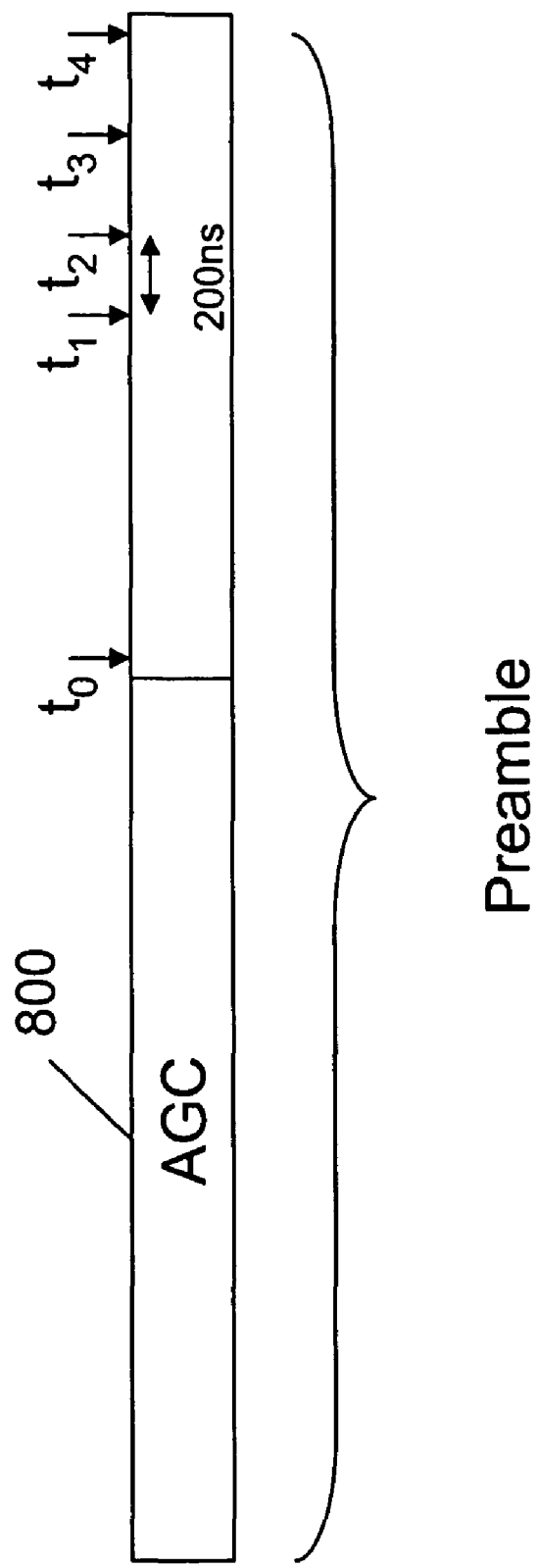
FIG. 7 is a timing diagram illustrating switching of an N-corner switchable high pass filter in accordance with aspects of the present invention.

FIG. 7 schematically depicts a signal diagram showing operation, for example, of the filter of FIG. 6 in the system, for example, of FIG. 1. In one embodiment, during reception of a preamble of a frame, an AGC in a receiver adjusts the gain applied to the received signal via, for example, an amplifier to provide optimal signal strength. This occurs at least during a gain adjustment period 800, and may also occur thereafter. During the gain adjustment period 800 the AGC corrects a substantial portion of DC offset.

Referring also to FIG. 7 upon completion of the gain adjustment period, the corner frequencies of the filters 710, 720, 740 are lowered at time $t_0$. The parallel filters 760, 770, 780, 790 reduce instantaneous DC offset error introduced by lowering the corner frequencies of the filters 700, 720, 740. The corner frequency of the filter 760 is lowered at time $t_1$. 200 ns later at time $t_2$, the corner frequency of the filter 770 is lowered. 200 ns later at time $t_3$, the corner frequency of the filter 780 is lowered and 200 ns later at time $t_4$, the corner frequency of the filter 790 is lowered. 200 ns is used to separate lowering of corner frequencies as one fundamental period T in a 802.11g-based frame is 800 ns.

Variations, modifications, and other implementations of what is described herein will occur to those of ordinary skill in the art without departing from the spirit and the scope of the invention as claimed. Although the invention has been described with respect to certain embodiments, it should be recognized that the invention includes the claims and their equivalents supported by this disclosure.

The invention claimed is:

1. A dc offset correction circuit for a radio frequency (rf) receiver, comprising:
a switchable high pass filter configured to receive a down-converted rf signal, the switchable high pass filter including N high pass filters interconnected in parallel, each of the N high pass filters having selectable corner frequencies, where N is a number greater than two.

2. The dc offset correction circuit of claim 1 wherein the selectable corner frequencies include a first corner frequency and a second corner frequency.

3. The dc offset correction circuit of claim 2 wherein at least some of the N high pass filters include a switched capacitance resistance.

4. The dc offset correction circuit of claim 2 wherein each of the N high pass filters are configured to operate with the first corner frequency or the second corner frequency based on a state of a control signal.

5. The dc offset correction circuit of claim 4 wherein the control signal comprises a plurality of control signals, and each N high pass filter switchable from a first corner frequency to a second corner frequency receives a different one of the plurality of control signals.

6. The dc offset correction circuit of claim 5 wherein the plurality of control signals are configured to change state at different times.

7. The dc offset correction circuit of claim 6 wherein the received rf signal includes a periodic component, and the plurality of control signals are configured to change state within a period of the periodic component.

8. The dc offset correction circuit of claim 2 wherein the N high pass filters comprise identical components, each filter having a plurality of controllable corner frequencies.

9. The dc offset correction circuit of claim 2 wherein the N high pass filters comprise substantially similar components, each filter having a plurality of controllable corner frequencies.

10. The dc offset correction circuit of claim 3 wherein each of the plurality of high pass filters has a plurality of controllable corner frequencies, the corner frequencies being controlled by a plurality of control signals triggered at different times.

* * * * *